TELESCOPIC JIB WITH A TELESCOPIC INCLINABLE END MEMBER FOR CRANES

Original Filed Dec. 29, 1969 3 Sheets-Sheet 1

TELESCOPIC JIB WITH A TELESCOPIC INCLINABLE END MEMBER FOR CRANES
Original Filed Dec. 29, 1969 3 Sheets-Sheet 3
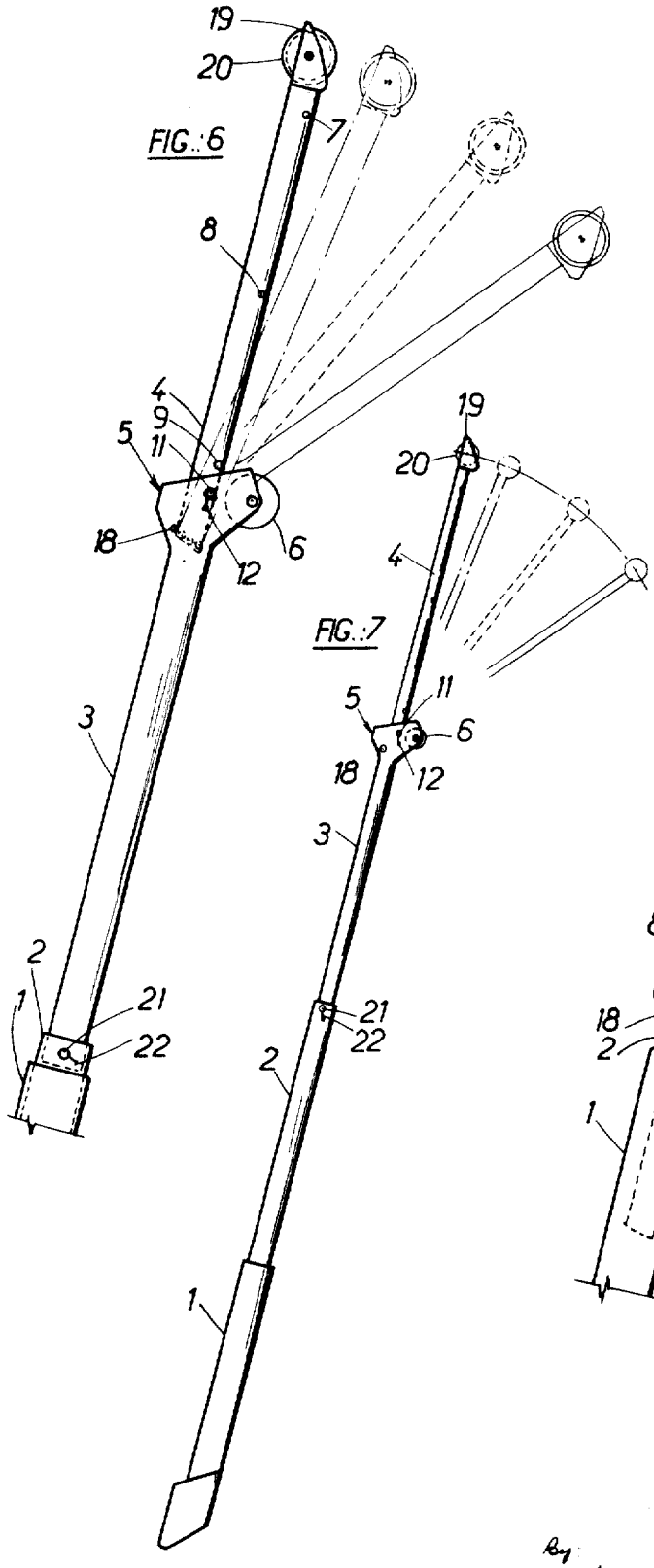
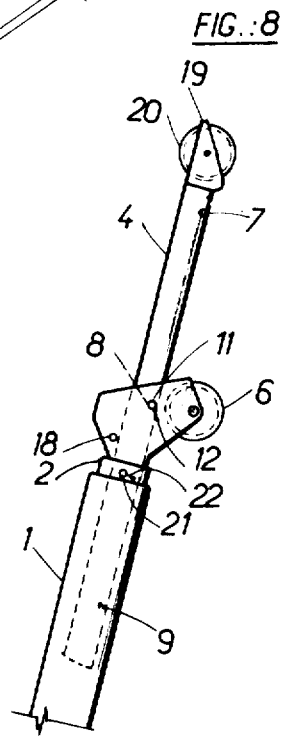
Inventor
Jean Fauchere
By Watson, Cole, Grindle & Watson
Attorneys United States Patent Office Re. 27,763
Reissued Sept. 18, 1973

27,763

TELESCOPIC JIB WITH A TELESCOPIC INCLINABLE END MEMBER FOR CRANES

Jean Fauchers, Sein, France, assignor to Richier, Paris, France

Original No. 3,620,379, dated Nov. 16, 1971, Ser. No. 888,726, Dec. 29, 1969. Application for reissue July 11, 1972, Ser. No. 270,735
Claims priority, application France, Dec. 30, 1968, 182,223
Int. Cl. B66c *23/06*
U.S. Cl. 212—55 3 Claims

Matter enclosed in heavy brackets [ ] appears in the original patent but forms no part of this reissue specification; matter printed in italics indicates the additions made by reissue.

ABSTRACT OF THE DISCLOSURE

A telescopic jib for a crane, the jib being provided with an inclinable telescopic end element which is slidable in the internal element of the jib and can be fixed to this element in various positions when it is aligned therewith, by pinning or the like, and which when in a fully extended position can assume various inclinations relative to the jib, the said end element then being capable of pivoting around the fixing pin and of being fixed in the selected inclined position by means of another pin or the like.

This invention relates to a telescopic jib for a crane, the jib being provided with an inclinable telescopic end element.

Cranes are known comprising a telescopic jib capable of being provided with a subsidiary jib mounted in an articulated manner on the end element of the jib, the inclination of this subsidiary jib generally being capable of being controlled with the aid of a nonrigid pull member. The employment of such a subsidiary jib has various disadvantages, viz, the minimum inclination of the subsidiary jib relative to the telescopic jib is limited by the risk of the subsidiary jib swinging onto the back of the jib (the nonrigid pull member not being capable of withstanding compression forces);

the length of the subsidiary jib is fixed, and when the subsidiary jib is not in use it is either folded and fixed to the jib, which on the one hand increases the space occupied by the latter and on the other hand makes the subsidiary jib very vulnerable to impact by the load, or it is removed, which necessitates dismantling.

The object of the present invention is to provide a telescopic jib having a telescopic end element which when it is aligned with the jib can be used in a fully extended position or in intermediate positions as required (in contrast to a subsidiary jib which is of fixed length), and which when it is in the fully extended position can assume various inclined positions just like a subsidiary jib.

In accordance with the invention, the telescopic jib comprises an end element which is slidable in the internal element of the jib and which can be fixed relative to this element in various positions when it is aligned therewith, by pinning or the like, and which when it is in the fully extended position can assume different inclinations relative to the jib, the end element then being capable of pivoting around the fixing pin and being capable of being selectively fixed in various inclined positions by means of another pin or the like.

In addition to the above-mentioned advantage of being capable of being used in various intermediate positions when it is aligned with the jib, the inclinable end element has, compared with a subsidiary jib, the advantage of being capable of being retracted into the jib. The inclinable end element thus allows bulkier loads to be lifted than is possible with telescopic cranes provided with subsidiary jibs, the said end element not forming an obstacle to the load. Likewise, the assembly of jib and inclinable element takes up less space and the inclinable element is not subjected to the risk of being damaged by impact of the load.

In the accompanying drawings,

FIGS. 1, 2, 3, 5, 6, 7, 8 and 9 are views in elevation of a telescopic jib provided with an inclinable telescopic end element in accordance with the invention, showing how the jib is prepared for operation and showing the various operating arrangements of the jib that are possible. FIGS. 6, 7 and 8 are on a smaller scale than the other figures.

FIG. 4 is a section on the lines IV—IV of FIG. 3, on a larger scale.

Figures 3, 4, 5:
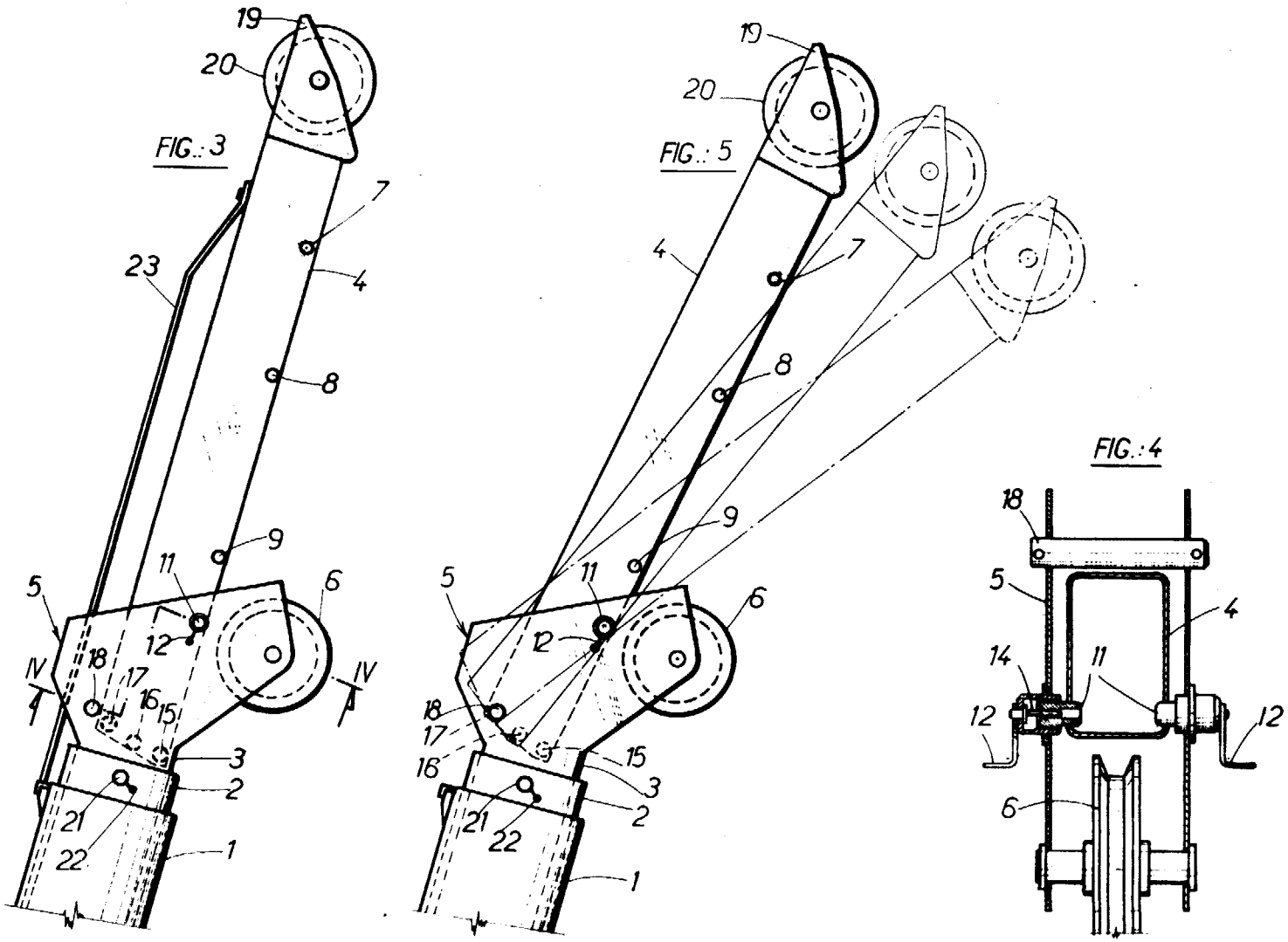

The jib illustrated comprises a plurality of telescopic elements 1, 2 and 3, and an inclinable end element 4 capable of sliding within the element 3. The jib is mounted on a platform or framework (not shown), and can be inclined relative to this platform in known manner. The telescopic elements are of rectangular section and the telescoping of the elements is effected hydraulically, the telescopic element 2 when moving outwardly drawing along the other telescopic elements in known manner. The telescopic element 3 carries at its upper part a head 5 on which is mounted a hoisting pulley 6. The inclinable end element 4 has two series of holes 7, 8, 9 and 10 distributed along its length and arranged on both sides of the element and enabling it to be fixed to the element 3 in various positions by means of two pins 11 controlled by two small handles 12 located at the exterior of the head 5 on each side thereof. These handles operate screw-threaded rods 14 on which the pins 11 are screwed, actuation of the handles 12 having the effect of engaging the pins 11 with the holes 7–10 or disengaging them (FIG. 4).

The inclinable element 4 also has holes 15, 16 and 17 in its lower part, enabling the element to be fixed in various inclined positions relative to the element 3 by means of a pin 18 that passes into holes formed in the head 5 and which, when it is not engaged in the holes 15, 16 or 17 serves as an abutment for preventing any inclination of the element 4. The element 4 also has at its upper part a head 19 carrying a hoisting pulley 20. Finally, the telescopic element 3, when in its fully extended position, may be locked to the element 2 by means of pins 21 of a form similar to that of the pins 11, the pins 21 being controlled by handles 22 and being engageable in holes formed in the upper part of the element 2.

The jib is prepared for use in the following manner.

Figure 2:
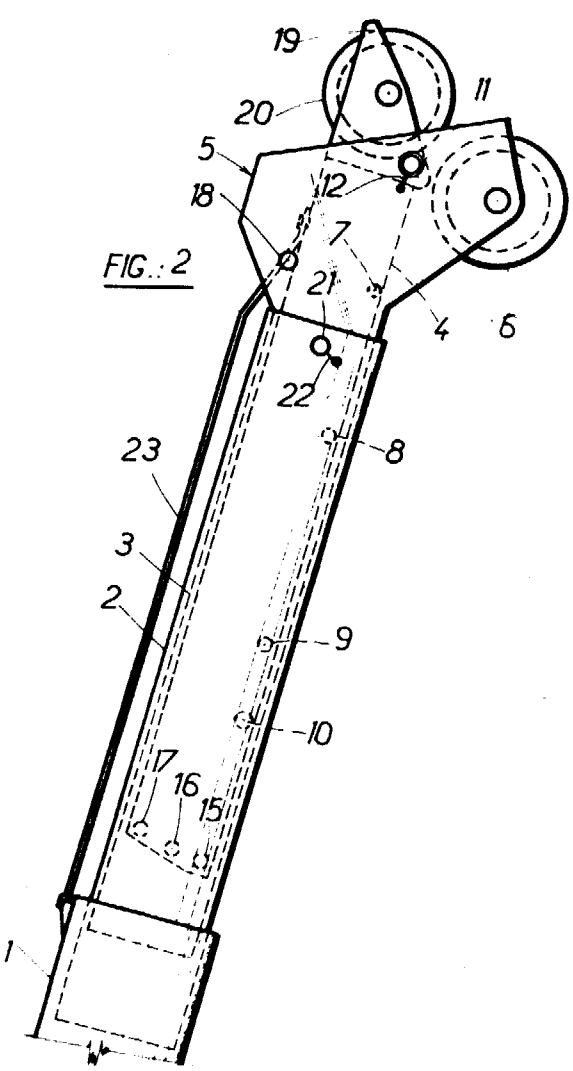
Figure 1:
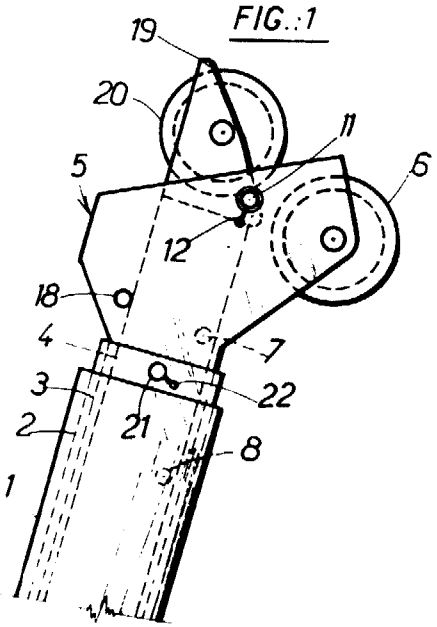

The elements 1, 2, 3 and 4 being initially in retracted positions (FIG. 1), the outward movement of the element 2 is effected hydraulically, and this element draws out the elements 3 and 4. When the element 2 is fully extended an auxiliary bar 23 is placed between the lower element 1 and the element 4, one end of this bar being fixed to the upper part of the element 4 and the other end of the bar being fixed to the upper part of the element 1 (FIG. 2). The element 2 is then retracted, and in its downward movement it draws down the element 3, and when the element 2 is fully retracted the pins 11 are engaged in the holes 10 in the element 4 by actuation of the handles 12 in such manner as to fix the elements 3 and 4 to one another (FIGS. 3 and 4). At this stage the bar 23 may be removed and the telescoping of the jib continued as described below if it is desired to use the element 4 in a position of alignment with the elements 1, 2 and 3 and at its greatest extension, in which case the pin 18 serves simply as an abutment preventing the element 4 from pivoting around the pins 11, or the bar 23 may be removed and the inclination of the element 4 relative to the elements 1, 2 and 3 adjusted by engaging the pin 18 in the holes 15, 16 or 17 according to the degree of bulkiness of the load to be hoisted (FIG. 5). This done, the element 3 is telescoped by again extending the element 2, placing an auxiliary bar of suitable length between the elements 3 and 1 (one end of the bar being fixed to the upper end of the element 3 and the other end of the bar being fixed to the upper part of the element), completely withdrawing the element 2, fixing the elements 2 and 3 together by means of the pins 21 by actuating the handles 22, and then removing the bar (FIG. 6). If necessary the length of the jib may be increased by extending the element 2 (FIG. 7).

In a modification, when it is desired to use the element 4 in an aligned position but extended to less than the maximum length, after the bar 23 has been placed between the elements 1 and 4 (FIG. 2) the element 2 may be partially retracted and the pins 11 inserted into the holes 7, 8 or 9 according to the desired useful extended length of the element 4. FIG. 8 shows the case in which the pins 11 are inserted into the holes 8. The telescoping of the elements 3 and 2 then takes place as above described.

In all the operating arrangements so far described one or other of the hoisting pulleys 6 and 20 may be used. The jib is preferably prepared for use with the element 1 slightly inclined to the horizontal, such that manipulation of the auxiliary bar and the handles may be performed at man height. In the course of the operation of inclining the element 4 it may be desirable, depending on the weight of the jib, to relieve the element 4 by raising the head 19.

Figure 9:
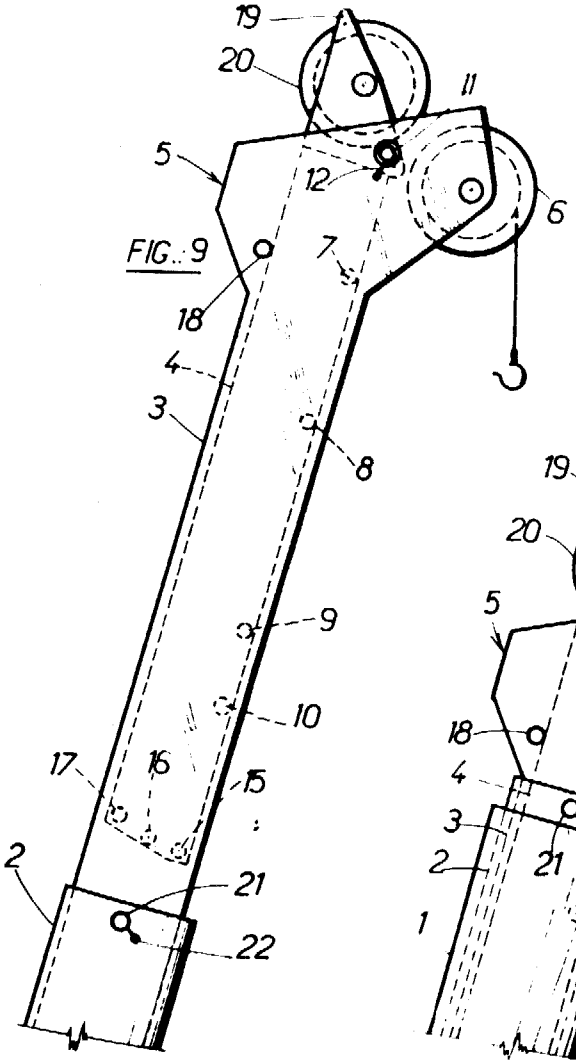

When it is not desired to use the element 4 it is of course possible to leave it in a retracted position in the element 3. In this case, the elements being initially in retracted position (FIG. 1), it is sufficient to extend the element 2, to place an auxiliary bar of suitable length directly between the element 3 and the element 1, to retract the element 2, to fix the elements 2 and 3 to one another by means of the pins 21, and if necessary to extend the element 2 again (FIG. 9). In this case, clearly, only the hoisting pulley 6 is used.

The jib according to the invention thus permits of a large number of operating arrangements which can be rapidly attained and do not necessitate dismantling.

I claim:

1. A telescopic jib for cranes, which comprises at least two telescopic elements, the internal element of said jib having a head portion projecting from the other jib element in its retracted position and carrying retractable pinning means;

an inclinable telescopic end element which carries a head provided with a hoisting pulley and is slidable in said internal element of the jib, said end element being provided with a plurality of axially spaced hole means cooperating with the retractable pinning means of the internal element and serving (1) to secure said end element relatively to said internal element in various aligned positions corresponding to various degrees of extension of the end element relatively to the internal element of the jib, said internal element being provided with a plurality of holes radially spaced about said retractable pinning means and second pinning means cooperating with said radially spaced holes (2) to incline said end element relatively to the internal element when said end element is pinned in its fully extended position; and means for securing said end element in a selected inclined position.

2. A telescopic jib as claimed in claim 1, wherein the means for securing the end element in a selected inclined position are pinning means.

3. A telescopic jib as claimed in claim 1, wherein the head portion of the internal element of the jib carries also a hoisting pulley.

References Cited

The following references, cited by the Examiner, are of record in the patented file of this patent or the original patent.

UNITED STATES PATENTS 2,575,564 11/1951 Rinkel ---------- 212—55

FOREIGN PATENTS 185,476 10/1966 U.S.S.R. ---------- 212—55

EVON C. BLUNK, Primary Examiner

M. F. MAFFEI, Assistant Examiner

U.S. Cl. X.R.

212—46 B, 144